United States Patent [19]

Hardenfelt

[11] 4,081,423

[45] Mar. 28, 1978

[54] SPREADING OR COATING COMPOSITION

[75] Inventor: Jarl Hardenfelt, Copenhagen, Denmark

[73] Assignee: Jarl Hardenfelt Material Development Centre, Copenhagen, Denmark

[21] Appl. No.: 674,439

[22] Filed: Apr. 7, 1976

Related U.S. Application Data

[63] Continuation of Ser. No. 432,095, Jan. 9, 1974, abandoned.

[30] Foreign Application Priority Data

Jan. 9, 1973  Denmark ................................ 88/73

[51] Int. Cl.$^2$ .............................................. C08L 67/00
[52] U.S. Cl. .................................. 260/40 R; 252/503;
252/511; 260/37 EP; 260/37 M

[58] Field of Search ............ 260/37 M, 40 R, 37 EP; 252/503, 511

[56] References Cited

U.S. PATENT DOCUMENTS

| 2,866,057 | 12/1958 | Peck | 252/503 |
| 3,173,885 | 3/1965 | Short | 252/503 |
| 3,910,852 | 10/1975 | Lederman et al. | 260/37 M |

FOREIGN PATENT DOCUMENTS 801,986  9/1958  United Kingdom ............. 260/37 M

Primary Examiner—Lewis T. Jacobs
Attorney, Agent, or Firm—Fleit & Jacobson

[57] ABSTRACT

A spreading or coating composition producing a metallic appearance including an organic binder containing a finely divided metallic powder of a grain size not exceeding 1 mm and further containing a substantial amount of powdered graphite.

10 Claims, No Drawings

SPREADING OR COATING COMPOSITION

This is a continuation of application Ser. No. 432,095 filed Jan. 9, 1974, now abandoned.

This invention relates to a spreading or coating composition producing a metallic appearance and comprising an organic binder containing a finely divided metallic powder of a maximum grain size of 1 mm.

The prior art is aware of coating compositions of this type, consisting for instance of an unsaturated polyester resin, possibly mixed with a solvent and with a high content of metallic powder such as powdered copper, iron, tin, zinc, chromium or precious metals.

The spreading or coating composition according to the present invention is characterized in that it further contains a substantial amount of powdered graphite. As a result of the addition of graphite, it is possible to lower the content of metallic powder without affecting the metallic appearance.

The metal/graphite mixture may contain from 5 to 60 percent by weight of graphite, depending on the metal employed. The preferred quantity according to the present invention is between 10 and 30 parts by weight of powdered graphite to 90-70 parts by weight of metallic powder.

The spreading composition may contain an arbitrary quantity of metallic powder. Examples of particularly suitable metals are copper, bronze, iron, tin and zinc. Also, the noble metals may be used where desired, for instance, silver, gold or platinum. On account of the high price of these metals the economic advantage of adding graphite is particularly great.

The organic binder used can be any material suitable for coating compositions, but setting resins such as, for instance, styrene/containing polyesters or epoxy resins are preferred because they set shortly after application without any appreciable shrinkage. The preferred quantity according to the present invention is from 15 to 200 parts by weight of organic binder to 100 parts by weight of mixed graphite and metal powders.

As already mentioned, the particle size of the metal powder and the graphite powder must be taken into account when determining the quantity of organic binder. Thus a tin powder of a grain size of 0.044 mm, corresponding to 325 mesh, will require from 0.1 to 0.2 gram of binder to one gram of tin powder. Where the particle size varies between 0.025 mm (500 mesh) and 1 mm (18 mesh), the amount of binder will normally vary between 0.1 and 1.0 gram to one gram of metal powder. Because of its lower specific gravity, graphite normally requires from 3 to 5 times as much binder, for instance from 0.4 to 5.0 grams of binder to one gram of graphite contained in the mixture dependent on the particle size.

Besides graphite, other additives may be used if desired, for instance small amounts of conventional filler such as asbestos, bentonite, chalk or pigments. But to avoid the risk of impairing the metallic appearance, it is advisable to minimize the amount of such additives.

The present invention will be illustrated by way of the following non-limiting examples:

EXAMPLE 1

100 grams of powdered copper of a particle size of 200 mesh was mixed with 45 grams of a styrene-containing fluid unsaturated polyester. 10 grams of powdered graphite of a particle size of 200 mesh was stirred into 20 grams of the same polyester. The two mixtures were kneaded together while adding 2 percent of benzoyl peroxide, based on the amount of polyester, and a small quantity of accelerator. The compounded mixture was spread on a plate and allowed to set for 10 hours at 20°-30° C. After setting, the surface was ground lightly with grinding paper of a grain size of 280, brushed with a steel brush and polished with wax. The result was a beautiful cupreous lustre coat of great durability.

EXAMPLE 2

100 grams of powdered iron of a grain size of approximately 200 mesh was mixed with 20 grams of 200 mesh graphite powder and the mixture was stirred into 100 grams of a fluid epoxy resin. After addition of an amine hardener the mixture was spread on a plate and left to set at room temperature for 24 hours.

What is claimed is:

1. A decorative coating composition for coating a surface of an article and for obtaining a metallic appearance of said surface consisting essentially of a settable organic binder, a powder of a single metal of a grain size not exceeding 1 mm and selected from the group consisting of copper, bronze, iron, tin, zinc, and noble metal powders, and a substantial amount of graphite particles, the ratio of said organic binder to said metallic powder and graphite particles being 15 to 200 parts of said organic binder to 100 parts of said metallic powder and graphite particles, said 100 parts of said metallic powder and said graphite particles consisting of 10 to 30 parts by weight of said graphite particles and 90 to 70 parts by weight of said metallic powder, said composition being free of solvent.

2. A decorative article comprising a decorative coating covering at least one surface of said article for obtaining a metallic appearance of said surface, the decorative composition consisting essentially of a set or cured organic binder, a powder of a single metal of a grain size not exceeding 1 mm and selected from the group consisting of copper, bronze, iron, tin, zinc, and noble metal powders, and a substantial amount of graphite particles, the ratio of said organic binder to said metallic powder and graphite particles being 15 to 200 parts of said organic binder to 100 parts of said metallic powder and graphite particles, said 100 parts of said metallic powder and said graphite particles consisting of 10 to 30 parts by weight of said graphite particles and 90 to 70 parts by weight of said metallic powder.

3. The composition of claim 2 wherein the noble metal powder is a silver, gold or platinum powder.

4. The composition of claim 2 wherein said organic binder is a polyester or epoxy resin.

5. The composition of claim 2 wherein said grain size of said metallic powder is between 0.025 mm and 1 mm.

6. The composition of claim 2 wherein said organic binder further contains small amounts of non-essential fillers.

7. The composition of claim 6 wherein said fillers comprise asbestos, bentonite, chalk or pigments.

8. A spreadable composition which is free from solvent and which on application to a surface produces a coating having an attractive metallic appearance, said composition consisting essentially of (1) a settable organic binder selected from the group consisting of a polyester and an epoxy resin; (2) a powder of a single metal having a grain size ranging from about 0.025 mm to 1 mm and selected from the group consisting of copper, bronze, iron, tin, zinc, silver, gold, and platinum powders; and (3) graphite particles, the ratio of said organic binder to said metallic powder and graphite particles being 15 to 200 parts of said organic binder to 100 parts of said metallic powder and graphite particles, said 100 parts of said metallic powder and said graphite particles consisting of 70 to 90 parts by weight of said metallic powder and 10 to 30 parts by weight of said graphite particles.

9. The composition of claim 8 which contains, in addition, non-essential fillers selected from the group consisting of asbestos, bentonite, chalk, and pigments.

10. A spreadable composition which is free from solvent and which on application to a surface produces a coating having an attractive metallic appearance, said composition consisting of (1) a settable organic binder selected from the group consisting of a polyester and an epoxy resin; (2) a powder of a single metal having a grain size ranging from about 0.025 mm to 1 mm and selected from the group consisting of copper, bronze, iron, tin, zinc, silver, gold, and platinum powders; and (3) graphite particles, the ratio of said organic binder to said metallic powder and graphite particles being 15 to 200 parts of said organic binder to 100 parts of said metallic powder and graphite particles, said 100 parts of said metallic powder and said graphite particles consisting of 70 to 90 parts by weight of said metallic powder and 10 to 30 parts by weight of said graphite particles.

* * * * *